United States Patent Office 3,443,057
Patented May 6, 1969

3,443,057
WORK-IN-CIRCUIT ARC WELDING APPARATUS
John P. C. Allen, Fanwood, John D. Bone, Matawan, and Frank J. Pilia, Short Hills, N.J., assignors to Union Carbide Corporation, a corporation of New York
Filed Dec. 14, 1965, Ser. No. 513,754
Int. Cl. B23k 9/10
U.S. Cl. 219—131                            6 Claims

ABSTRACT OF THE DISCLOSURE

The disclosure provides a solid state control system for keeping the arc length constant in an inert gas shielded arc welding nonconsumable electrode set-up. The arc voltage is compared against a reference voltage with the difference voltage supplied as an error signal to highly sensitive control circuitry for activating a stepping motor which in turn raises or lowers the torch to maintain the arc voltage constant.

---

Figure 1:
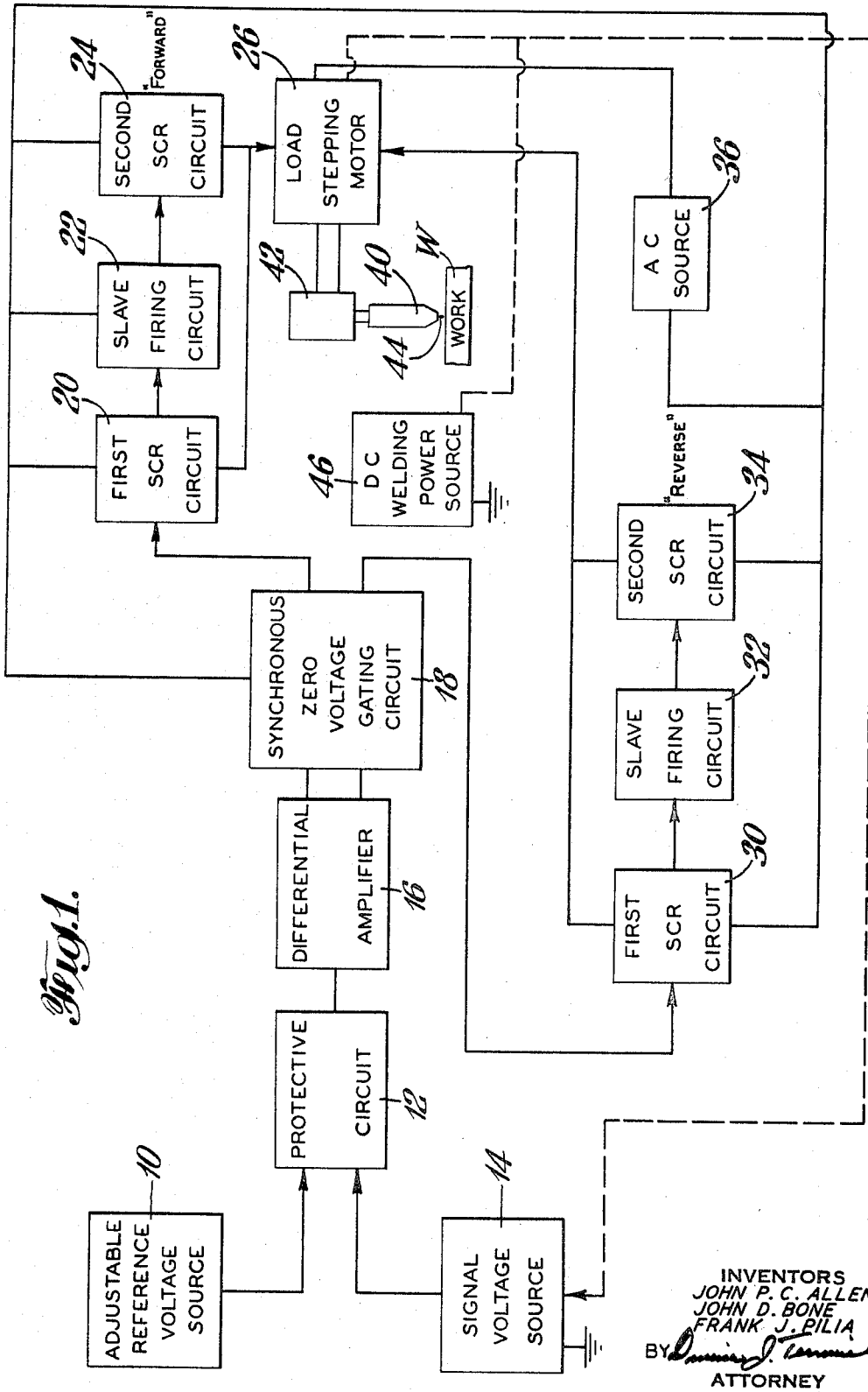

This invention relates to work-in-circuit arc welding, and more particularly to inert gas-shielded arc welding with a nonconsumable electrode.

In fabricating spacecraft, such as missiles, the desire for quality of the welds is such that virtual perfection is demanded. This requires that the arc length be regulated at virtually 100% to maintain a preset value that is adjustable.

The main object of this invention is to provide apparatus that meets such high standards.

This is accomplished by a novel arc voltage control system which comprises an arc voltage head and a solid state voltage control. The head consists of a stepping motor coupled to a ball screw drive, which raises and lowers the welding torch. The direction of rotation of the stepping motor is determined by the manner in which 60 cycle, A.C. power is fed to it. The speed reduction between the motor and the torch results in a correction of 0.00125 in. for each A.C. cycle corresponding to a fixed torch speed of 4.5 in. per minute. The head can reverse direction within 1½ cycles or 0.025 second and can start from rest, make one step of correction and stop within one cycle or 0.017 second.

The arc voltage head has been engineered to permit essentially zero mechanical deflection due to torch loads within its rating. The use of a double, ball bearing drive block configuration on the ball screw assembly and a timing belt drive, combine to eliminate backlash.

The voltage control assembly matches the arc voltage against an adjustable regulated reference voltage source and feeds the difference between them (the "error" voltage) to a very stable transistorized differential amplifier with an inherent sensitivity of 0.005 volt. The desired value of reference voltage is set by means of the arc voltage control potentiometer.

When the actual arc voltage exceeds the reference voltage by 0.005 volt (or some greater error depending upon the setting of the sensitivity control) the differential amplifier output is sufficient to trigger the voltage control power output stage. Integral cyclies of A.C. are fed to the stepping motor to cause it to lower the torch in 0.00125-in. increments until the arc voltage is once more at the desired value. Conversely, as the arc voltage tends to become less than the reference voltage, power is fed to the stepping motor to raise the torch.

The differential amplifier utilizes a pair of silicon transistors in a common size TO–5 case to hold thermal drift to a negligible level. The transistors are operated Class A for maximum sensitivity and fed from a closely regulated 10-volt supply. A protective network at the amplifier input limits the signal to the differential amplifier to a safe value for input voltages of up to 100 v. D.C.

The output of the differential amplifier is zero for no error signal input. When an error signal is present, its polarity determines the polarity of the amplifier output. This output is fed to a pair of gating circuits, which control the power output stage of the control. When the gating circuit threshold level is exceeded, one or other of two silicon controlled rectifiers (SCR's) is switched synchronously with the A.C. line and feeds one half cycle of A.C. to the stepping motor. The polarity of the amplifier output determines which gating circuit, and thus which SCR is switched. The SCR which is switched also "slaves" a second SCR to feed a second half cycle of A.C. to the motor. The net result is to feed a full cycle of A.C. to the motor. Since the power SCR's operate synchronously with the A.C. line, the control is insensitive to the effects of power line ripple in the arc. Sensitivities many times greater than are normal in conventional equipment may thus be used.

The reference voltage may be set in the range of from zero to 24 volts.

Figure 2:
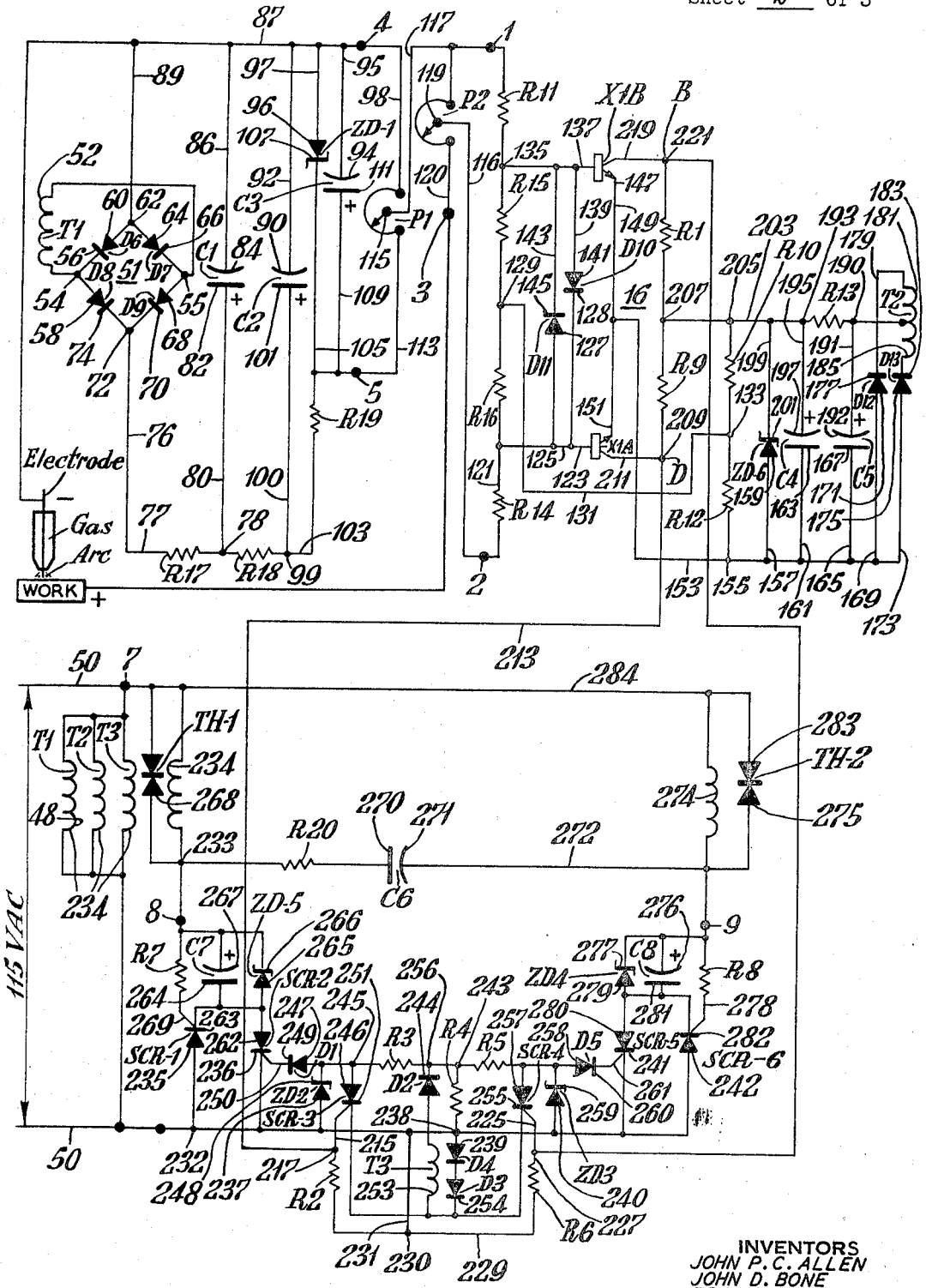
Figure 3:
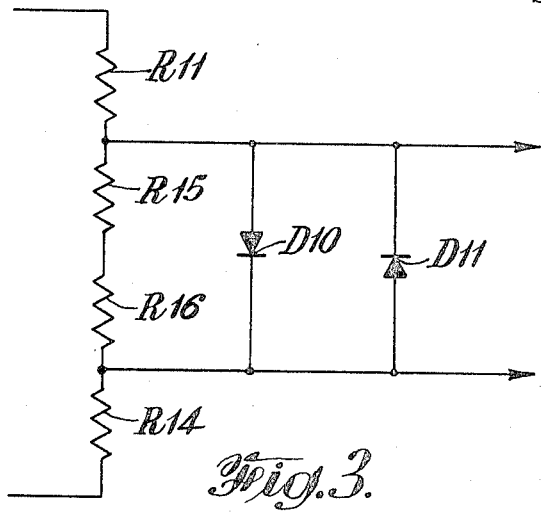
Figure 4:
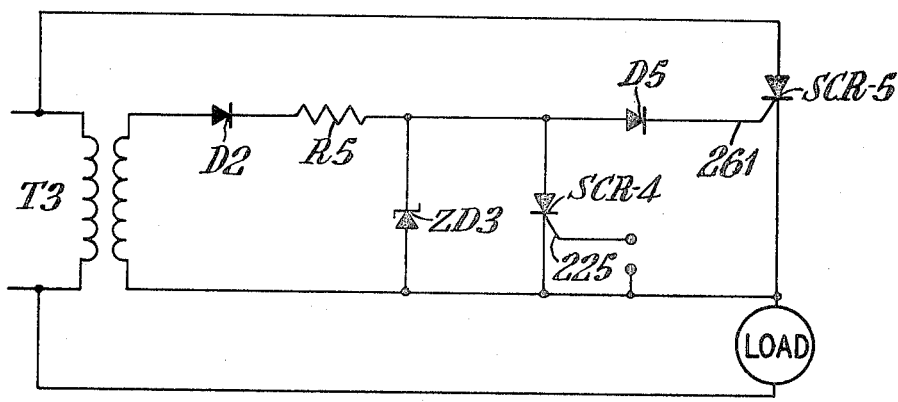
Figure 5:
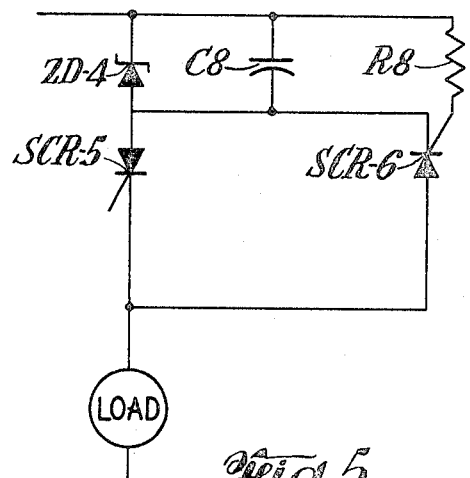

In the drawings:
FIGURE 1 is a block diagram of a control circuit illustrative of the invention;
FIGURE 2 is a circuit diagram of the whole system;
FIGURE 3 is a circuit diagram of the protective circuit feature of the invention;
FIGURE 4 is a circuit diagram of the gate circuit; and
FIGURE 5 is a circuit diagram of the slave circuit.

As shown in FIGURE 1, an adjustable reference voltage source 10 is connected to the protective circuit 12. A signal voltage source 14 is also connected to such circuit. The output of the circuit 12 is fed to a differential amplifier 16 that is, in turn, connected to synchronous zero voltage gating circuit 18. The "forward" going (torch raising) output of the latter is fed to a first SCR (silicon controlled rectifier) circuit 20 that is provided with a slow slave firing circuit 22 which is connected to a second SCR circuit 24. The latter is connected to the load, such as the stepping motor 26, as is the output of the first SCR circuit 20.

Similarly, the "reverse" going (torch lowering) output of the gating circuit 18 is fed to first SCR circuit 30, connected to slow slave firing circuit 32 which, in turn, is connected to second SCR circuit 34. An A.C. source 36 is connected to the load 26 and to the SCR circuits 20, 24 and 30, 34, as well as to the gating circuit 18.

Torch 40 is adapted to be raised or lowered with respect to the work W by stepping motor 26 through a ball screw drive 42. A welding arc is energized between the tungsten electrode 44 of the torch and work W by a D.C. welding power source 46. The arc welding voltage between the end of such electrode and the work is fed back to the protective circuit 12 and in the present example constitutes the signal voltage source 14. Thus, in operation, the system operates to keep the arc welding voltage substantially constant by automatically raising or lowering the torch 40 in response to any incipient increase or decrease, respectively, in the arc length.

Referring to FIGURE 2, the primary 48 of transformer T1 connected through leads 50, 50 to the 60 cycle voltage source 36. The secondary 52 is connected to the input terminals 54 and 55 of a full wave bridge type rectifier 51 consisting of diodes D6, D7, D8 and D9. The cathode 56 of diode D6 is connected through terminal 54 to the anode 58 of diode D8. The anode 60 of diode D6 is connected through output terminal 62 to the anode 64 of diode D7. The cathode 66 of diode D7 is connected through input terminal 55 to the anode 68 of diode D9 and the cathode 70 of diode D9 is connected through output terminal 72 to the cathode 74 of diode D8. The output terminal 72 between the cathode 74 of diode D8 and the cathode 70 of diode D9 is connected by lead 76 to one terminal 77 of resistor R17. The other terminal 78 of resistor R17 is also one terminal of resistor R18 and is connected by lead 80 to the positive plate 82 of electrolytic capacitor C1. The negative plate 84 of electrolytic capacitor C1 is connected by leads 86, 87 and 89 to the output terminal 62 of rectifier 51, negative plate 90 of electrolytic capacitor C2 by lead 92. Such terminal 62 is likewise connected to the negative plate 94 of electrolytic capacitor C3 by lead 95, the cathode 96 of Zener diode ZD1 by lead 97, one end of potentiometer P-1 by lead 98. The terminal 99 of resistor R18 that is electrically removed from the common point 78 of resistor R17, R18 and the positive plate 82 of capacitor C1, is connected by lead 100 to the positive plate 101 of capacitor C2, and by lead 103 to resistor R19. The other end of resistor R19 is connected by lead 105 to the anode 107 of Zener diode ZD1, by lead 109 to the positive plate 111 of capacitor C3, and by lead 113 to the other end of potentiometer P-1. The wiper 115 of potentiometer P-1, is connected by lead 117 to one end of potentiometer P2 and to one end of resistor R11. The other end of potentiometer P2 is connected by lead 12D to the positive terminal 3 of the error signal circuit. The negative terminal 4 of the error signal circuit is connected via lead 87 to the negative plates of capacitors C1, C2, C3.

The wiper 119 of potentiometer P2 is connected by lead 116 to terminal 2, which is connected to one end of resistor R14. The other end of resistor R14 is connected to one end of resistor R16 by lead 121 to the base terminal 123 of transistor XIA of differential amplifier 16 by lead 125; to the anode 127 of diode D11 and the cathode 128 of diode D10. The other end of resistor R16 is connected via terminal 129 to one end of resistor R15, and via lead 131 to to the common connection 133 between resistors R10 and R12. The other end of resistor R15 is connected via terminal 135 to the end of resistor R11 electrically removed from the connection previously made to one end of potentiometer P2. The common terminal 135 between resistor R11 and resistor R15 is connected by lead 137 to the base terminal of transistor XIB of the differential amplifier 16, by lead 139 to the anode 141 of diode D10, and by lead 143 to the cathode 145 of diode D11.

The emitter 147 of transistor XIB is connected by lead 149 to the emitter 151 of transistor XIA and such lead 149 is connected by lead 153 to the end 155 of resistor R12, electrically removed from the common connection between R12, R10, R15 and R16. The end 155 of resistor R12 connected to the emitters 147 and 151 of transistors XIA and XIB, is connected by lead 157 to the cathode 159 of Zener diode ZD6, by lead 161 to the negative plate 163 of electrolytic capacitor C4, by lead 165 to the negative plate 167 of capacitor C5, by lead 169 to the anode 171 of diode D12, and by lead 173 to the anode 175 of diode D13. The cathode 177 of diode D12 is connected by lead 179 to one end of the secondary winding 181 of transformer T2. The cathode 183 of diode D13 is connected by lead 185 to the other end of the secondary winding 181 of transformer T2. The center tap 187 on the secondary winding 181 of transformer T2 is connected by lead 189 to end 190 of resistor R13, by lead 191 to the positive plate 192 of capacitor C5. The other end 193 of resistor R13 is connected by lead 195 to the positive plate 197 of capacitor C4, by lead 199 to the anode 201 of Zener diode ZD6, by lead 203 to the end 205 of resistor R10 (removed from the common electrical connection of R10, R12, R15, R16) and to the common connection 207 of resistors R1 and R9.

From the connection 209 between the collector 211 of transistor XIA of the differential amplifier to one end of resistor R9, a connection is made by lead 213 to the gate 215 of silicon controlled rectifier SCR-3 and terminal 217 of resistor R2. From the collector 219 of transistor XIB and one end 221 of resistor R1 a connection is made by lead 223 to the gate 225 of silicon controlled rectifier SCR-4 and terminal 227 of resistor R6. The other end of resistor R6 is connected by lead 229 to the end of resistor R2, electrically removed from the gate 215 of silicon controlled rectifier SCR-3. The common connection 230 between resistor R2 and resistor R6 is connected by lead 231 to one side 232 to the 115 v. A.C. 60 cycle input power to the control. This connection is common with the following components: One end 233 of the primary winding 234 of transformers T1, T2 and T3, the anode 235 of SCR-1, the cathode 236 of SCR-2, the cathode 237 of Zener diode ZD2, the junction 238 of one end of resistor R4 and the anode 239 of diode D4, the cathode 240 of Zener diode ZD3, the cathode 241 of SCR-5 the anode 242 of SCR-6 and the cathode 255 of SCR-4.

The end of resistor R4 (removed from the common junction between the anode of diode D4 and the rest of the components listed above) is connected at 243 to one end of resistor R5, to the cathode 244 of diode D2 and to one end of resistor R3. The other end of resistor R3 is connected at 245 to the anode 246 of SCR-3, the anode 247 of diode D1 and to the cathode 248 of Zener diode ZD-2. The cathode 249 of diode D1 is connected to the gate 250 of SCR-2. The cathode 251 of SCR-3 is connected by lead 252 to one end of the secondary 253 of transformer T3, the cathode 254 of diode D3 and to the cathode 255 of SCR-4. The anode 256 of diode D2 is connected to the other end of the secondary winding 253 of transformer T3. The connections to the ends of the secondary of T3 are made such that 256 is positive with respect to 253 whenever 284 is positive with respect to 238. The end of resistor R5 is removed from the common electrical connection 243 between R3, R4, and the cathode 244 of diode D2 is connected to the anode 257 of SCR-4, the anode 258 of diode D5 and the anode 259 of Zener diode ZD-3. The cathode 260 of diode D5 is connected to the gate 261 of SCR-5.

The anode 262 of SCR-2 is connected to the cathode 263 of SCR-1, the negative plate 264 of capacitor C7 and the cathode 265 of Zener diode ZD5. The anode 266 of Zener diode ZD-5 is connected to the positive plate 267 of capacitor C7, one end of resistor R7, end 268 of thyrector TH-1, one end of resistor R20 and one end of one of the motor field windings 234. The other end of resistor R7 is connected to the gate 269 of SCR-1. The other end of resistor R20 is connected to plate 270 of the A.C. capacitor C6. The other plate 271 of capacitor C6 is connected by lead 272 to the other field winding 274 of the stepping motor M, to end 275 of thyrector TH-2 to one end of resistor R8, to the positive plate 276 of capacitor C8 and to the anode 277 of Zener diode ZD-4. The other end of resistor R8 is connected to the gate 278 of SCR-6. The cathode 279 of Zener diode ZD-4 is connected to the anode 280 of SCR-5, to the negative plate 281 of capacitor C8 and to the cathode 282 of SCR-6.

The other end 283 of thyrector TH-2 is connected by lead 284 to the other side of the A.C. input power 50 to the unit and is common with the ends of the motor field windings, thyrector TH-1, the other ends of the primary windings of transformers T1, T2, and T3.

The secondary voltage obtained from transformer T1 is rectified by the full wave bridge rectifier combination of diodes D6, D7, D8 and D9. The full wave D.C. is then applied to capacitor C1 through resistor R17. Resistor R17 limits the peak changing currents to capacitor C1 to prevent damage to diodes D6, D7, D8, and D9. The D.C. voltage appearing across capacitor C1 is filtered by the RC combination of capacitor C2 and resistor R18. The filtered D.C. voltage appearing across C2 is applied to the Zener diode resistor capacitor network of ZD-1, C2 and R19. The voltage across ZD-1 is maintained constant within the voltage characteristic of the Zener with the series dropping resistor R19. Capacitor C3 inhibits serious voltage fluctuations sometimes encountered using Zener diode voltage regulators. The voltage appearing across Zener diode ZD-1 and capacitor C3 is applied to potentiometer P1 and is used as a stable D.C. reference voltage to which the input signal is compared.

Terminal 4 is negative and terminal 5 is positive, the negative side of the error signal is connected to terminal 4. The positive voltage as selected by the wiper 115 of potentiometer P1 is applied to one side of the sensitivity potentiometer P2 and terminal 1. The positive side of the error signal is applied to the other side of the sensitivity potentiometer P2. The difference between the D.C. reference voltage and the error voltage thus appears across the sensitivity potentiometer P2. A portion of this error voltage is applied to the signal input terminals of the differential amplifier terminals 1 and 2. With zero error signal applied between terminals 1 and 2 the differential amplifier is in a balanced condition where each side is conducting equally and the voltage differential between points B and D at terminals 221 and 209 is substantially zero.

The D.C. voltage for the differential amplifier is obtained from the secondary of transformer T2. Diodes D12 and D13 allow alternate half cycles of each half of the voltage to appear across the secondary of transformer T2. The alternate half cycles are applied across capacitor C5 which charges to the peak voltage of one half of the transformer secondary. The full wave D.C. voltage appearing across capacitor C5 is applied to capacitor C4 through resistor R13. The D.C. voltage appearing across capacitor C4 is applied across Zener diode ZD-6. The combination of ZD-6, C4 and R13 act to maintain a constant voltage across ZD-6 by the Zener action of the Zener diode and the series resistance of R13, C4 provides additional filtering and protection against spurious fluctuations in the Zener voltage. The Zener diode voltage is applied across resistors R12 and R10. The negative end of R12 is connected to the common connection of the emitters of transistor X1A and X1B of the differential amplifier. The positive voltage at the junction of R12 nad R10 is applied to the base of X1A and X1B through resistors R15 and R16. The forward D.C. bias supplied by the voltage across R12 provides sufficient base current to place the collector voltages at their mid point of 4.5 volts D.C. with regard to the negative voltage appearing at the negative end of resistor R12. The positive voltage at the end of R10 is applied to the junction of R1 and R9 and completes the collector circuit of the differential amplifier.

In operation, the A.C. voltage obtained from the secondary winding of transformer T1 is converted into full wave D.C. voltage by the diodes D6, D7, D8 and D9. This full wave voltage is applied across the 250 mfd. capacitor C1 rated at 50 w.v. D.C. The capacitor charges to the peak voltage of the rectified full wave output of the diode bridge through resistor R17 which is a 15 ohm ½ watt resistor. Resistor R17 limits the peak charging currents into capacitor C1 to a value sufficiently low to prevent damage to the diode bridge. The D.C. voltage appearing across capacitor C1 is applied to capacitor C2 through resistor R18. Capacitor C2 is a 250 mfd. 40 w.v. D.C. capacitor and resistor R18 is 15 ohm ½ watt. The D.C. voltage appearing across capacitor C2 is applied across the Zener diode and capacitor C3 combination and resistor R19. R19 is a 620 ohm 1 watt carbon resistor and limits the D.C. current through the Zener diode ZD1 to the required value. Capacitor C3 is a 20 mfd. 50 w.v. D.C. capacitor to absorb Zener transients and maintain the Zener voltage at a steady value. Zener diode ZD1 is a 24 volt 1.5 watt device No. 1N3798. The D.C. voltage appearing across the parallel combination of ZD1 and C3 provides a source of D.C. regulated reference voltage to which an error signal may be compared.

The D.C. power for the operation of the dual transistor differential amplifier circuit is obtained for the secondary A.C. voltage of transformer T2. This A.C. voltage is connected to diodes D12 and D13 which rectify each half cycle from the center tap to either end of the secondary winding. This full wave rectified voltage is applied to capacitor C5, which is connected across the rectified full wave output. Capacitor C5 is a 100 mfd. 25 w.v. D.C. capacitor and charges to the peak voltage appearing from the center tap to either anode of diodes D12 or D13. The D.C. charge stored across the plates of capacitor C5 is applied across Zener diode ZD6, capacitor C4, resistors R10, R12, the differential amplifier circuit and through series resistor R13. Capacitor C4 is a 500 mfd. 15 w.v. D.C. and resistor R13 is 120 ohm ½ watt resistor. Capacitor C4 smoothes out any ripple appearing across C5 to an acceptable level and provides stability to Zener diode ZD6. Zener diode ZD6 is a 10 volt 1 watt 57° tolerance Zener diode, and in conjunction with resistor R13 provides a stable D.C. voltage to operate the differential amplifier. Resistors R12 and R10 connected across Zener diode ZD6 provide a voltage divider such that the voltage drop across R12 is of the proper value to provide positive bias to the differential amplifier.

Referring to FIGURES 1 and 2, the function of the voltage control circuit is to receive a small D.C. error voltage between terminals 1 and 2, and respond by causing a large A.C. voltage to become available. Depending upon the polarity of the error, the A.C. voltage appears between terminals 8 and 7 or 9 and 7. The A.C. voltage is then used to operate some external device (such as a stepping motor) to initiate corrective action. Also included in the circuit is a reference voltage supply whose output voltage appears between terminals 4 and 5. This voltage may be used to supply external circuitry from which the D.C. error voltage is derived.

In the present embodiment, the circuit is used to maintain an external voltage at a constant adjustable value by comparing it with the reference voltage. The constant voltage might for example be the voltage of a D.C. arc, connected between terminals 3 and 4 so that terminal 3 is positive with respect to terminal 4. When the voltage potentiometer is adjusted to some value, the difference between the arc and reference voltages appears between terminals 3 and 1. This voltage will vary in polarity depending upon whether the value of the reference or arc voltage is greater. A portion of this voltage is selected by the sensitivity potentiometer and fed to the input terminals 1 and 2 of the differential amplifier.

Under no-error-voltage conditions, both transistors X1A and X1B are conducting equally and draw current through resistors R15 and R16, thus developing voltage across them. Since the differential amplifier is a symmetrical system comprising two matched halves, the voltage between the ends of the two resistors (points B and D) is essentially zero. Thus, no voltage appears across the ends of resistors R2 and R6 which are also connected between points B and D.

SCR3 and SCR4 receive a signal of approximately 1.2 to 1.5 volts between their gates (+) and cathodes which is the voltage dropped by the passage of current through D3 and D4. This current flows whenever the output of T3 SEC is of the proper polarity for D2 to conduct. Whenever D2 conducts, a positive voltage is also applied via R3 to the anode of SCR3 and via R5 to the anode of SCR4. This voltage is limited by ZD2 and ZD3 respectively to approximately 5 volts. Because the gates of SCR3 and SCR4 also are sufficiently positive to fire them, these SCR's conduct and pass the voltage on their anodes so that the net anode-cathode voltage across each SCR is its forward drop or about 1 volt. This voltage is applied to the gates of the power rectifiers SCR2 and SCR5 via diodes D1 and D5 respectively but because it is smaller than the forward drop of two P-N junctions in series (D1 plus SCR2 gate or D5 plus SCR5 gate), no current flows. Thus, SCR2 and SCR5 do not fire.

When the error voltage causes terminal 2 to become positive with respect to terminal 1, the collector current of transistor X1B is reduced, and the collector current of transistor X1A is increased. Thus point D becomes negative with respect to point B and also with respect to the mid-point connection of R2 and R6. The gate of SCR3 loses its positive voltage, but if it is at that instant conducting, it will continue to do so until is anode supply voltage drops to zero, or in other words, until the end of the half cycle. When the anode of SCR3 next begins to go positive, if terminal 1 still sees a negative error voltage, SCR3 will not fire. Thus, the full 5-volt anode voltage of SCR3 will be fed via D1 to the gate of SCR2. At this instant, the anode of SCR2 becomes positive and SCR2 fires.

The anode current from SCR2 flows through ZD5 and drives the load which is here represented by a 2-phase stepping motor. ZD5 develops approximately 5 volts across itself, which charges condenser C7. C7 retains its full charge for as long as SCR2 conducts. When the anode voltage of SCR2 falls below about 0.7 volt, it stops conducting. At this point, the total supply voltage will instantaneously have fallen to about 6 volts, which is the sum of the drops across ZD5 and SCR2 in series.

C7 begins to discharge into the gate of SCR1. Approximately 100 microseconds later, the anode voltage of SCR1 begins to go positive so that SCR1 fires. When this occurs, the anode current of SCR1 passes through ZD5 in its forward direction. C7 is discharged and receives a very small negative charge.

Thus, SCR2 can be fired only at the beginning of half cycles during which its anode is positive and whenever SCR2 fires, SCR1 will fire in the following half cycle. If SCR2 does not fire, SCR1 will not fire. The load is fed only complete cycles of A.C. with effectively no clipping or distortion. This is the type of drive power required by the motor. Additionally, since when SCR2 conducts, the reverse voltage of SCR1 can be no greater than the forward voltage on SCR2; there can be no occasion when gate current is fed to SCR1, while its anode is substantially negative, which would lead to excessive gate junction heating of the device.

When the polarity of the error voltage is reversed, the other half of the circuit including X1B, SCR4, SCR5 and SCR6 is operative and power is switched (in integral cycles only, as before) to terminal 9.

When the arc voltage and the reference voltage are of the same order of magnitude, the error voltage is small compared with the maximum permissible voltage which may be fed between the bases of X1A and X1B. However, when the arc is to be started, the power supply open circuit voltage will be supplied to the control. In this case, the base-to-base voltage might be as high as 75 volts, which would be sufficient to destroy X1. For this reason, a protective circuit consisting of R11, R14, D10 and D11 is employed. When the voltage between the bases exceeds about 0.6 volt, either D10 or D11 conducts depending upon the polarity and maintains the voltage at a low value which does not exceed about 0.8 volt for 100-volt input with the typical circuit shown. The rest of the voltage is dropped across R11 and R14 in series (these could be a single resistor). It is thus permissible to supply either full open circuit voltage (in which case the unit will respond as to high arc voltage and drive the electrode down) or short-circuit voltage (in which case the unit will respond as to low arc voltages and pull the electrode back). The protective circuit thus causes the unit to make a retract start without further circuitry being required.

The gate circuit and slave circuit, particularly the latter, have features of novelty and simplicity which would make them applicable to many SCR applications. The protective circuit is applicable to any signal circuit which may be subject to massive overloading.

What is claimed is:

1. Inert gas shielded non-consumable electrode electric arc welding apparatus, comprising an arc voltage head, and a solid state arc voltage control circuit, said head including a motor, an inert gas shielded non-consumable electrode arc welding torch, and means coupled to said motor and said torch for raising and lowering said torch with respect to the work by operation of said motor, said control circuit comprising an adjustable regulated D.C. reference voltage source, a welding arc voltage responsive feedback circuit, a transistorized differential amplifier connected to said feedback and voltage source so as to be responsive to any voltage difference (error) between them, a pair of gating circuits each comprising a main silicon controlled rectifier circuit and an auxiliary silicon controlled rectifier circuit, the auxiliary rectifier circuit in each of said gating circuits being connected to said amplifier for controlling the main rectifier circuit associated therewith such that only one half cycle of A.C. is fed to said motor when the gating threshold level of the main rectifier circuit is exceeded thereby permitting one half cycle of the A.C. line to pass to the motor, the polarity of the differential amplifier output determining which auxiliary silicon controlled rectifier is switched on, and slave circuits associated with said controlled rectifier circuits in each of said gating circuits each comprising a slave silicon controlled rectifier for feeding a second half cycle of A.C. to said motor, the net result being the feeding of a full cycle of A.C. to the motor, whereby since the auxiliary silicon controlled rectifiers operate synchronously with the A.C. line, the voltage control circuit is insensitive to harmful power line ripple in the arc, while maintaining the length of the welding arc constant in response to the arc voltage derived therefrom.

2. Inert gas shielded non-consumable electrode arc welding apparatus as defined in claim 1 wherein the output of each of said main silicon controlled rectifier circuits produce integral half cycles of line current independently of the time at which an input signal is applied to the gating circuits, said gating circuits further comprising a source circuit for producing trigger pulses each pulse of which is of sufficient magnitude and suitable phase relationship to the anode potential of each of said main silicon controlled rectifier circuits to fire one of said main silicon controlled rectifier circuits substantially when such anode potential passes through zero in a positive going direction for an input signal of one polarity and to fire the other for an input signal of opposite polarity, said auxiliary silicon controlled rectifier circuits being connected across such trigger pulse source circuit for short circuiting such trigger pulses in response to an input signal applied between the gate and cathode elements of either auxiliary silicon controlled rectifier circuit whereby when the input is applied before or during at least the beginning of any trigger pulse, the auxiliary rectifier circuit will conduct the whole trigger pulse, even though the input may be removed before the end of said trigger pulse, thus ensuring that the main rectifier circuit will not fire, but when the input is applied after the beginning of the trigger pulse, the leading edge and possibly some further portion of said trigger pulse will be passed to the main rectifier circuit, thus firing such main rectifier circuit after which, even though the input is applied, and causes the auxiliary rectifier circuit to short circuit the remainder of said trigger pulse, the main rectifier circuit will continue to fire until its anode potential is reduced substantially to zero at the conclusion of the line current half cycle.

3. Inert gas shielded non-consumable electrode electric arc welding apparatus as defined in claim 1 wherein each slave silicon controlled rectifier circuit comprises: a slave silicon controlled rectifier circuit responsive to the output of the main silicon controlled rectifier circuit to cause such slave rectifier circuit associated therewith to conduct A.C. line current for ½ cycle only when such main rectifier circuit has just previously conducted line current of the opposite polarity, a circuit connecting such slave and main rectifier circuits mutually in inverse parallel relation and together in series relation with a parallel combination of an avalanche diode and a capacitor so that when such main rectifier circuit conducts said capacitor is charged to a voltage level determined by the avalanche potential of said avalanche diode, which is connected to experience current flow from such main rectifier circuit in the direction in which said diode will avalanche, and a resistor connected between the terminal of said capacitor remote from its common connection with such rectifier circuits and the gate terminal of such slave rectifier circuit so that when such main rectifier circuit conducts and causes a charge to appear on said capacitor, an amount of such charge sufficient to fire it is fed to such slave rectifier, which in turn by conducting in a polarity opposing the polarity of such charge causes the balance of such charge remaining on said capacitor substantially to disappear, thereby inhibiting such slave rectifier from conducting any subsequent half cycle except in response to prior conduction of such main rectifier.

4. The combination of the circuit as defined in claim 2 further comprising the output of said differential amplifier being connected as the input of the circuit, so as to significantly change the level of signal applied to the input of the gating circuits, which is required to produce the desired output from the combination, and a voltage protective circuit connected so as to protect the input of said D.C. differential amplifier from unwanted overvoltage.

5. The combination of the circuit as defined in claim 4 wherein the motor is a 2-phase A.C. stepping motor, and means connecting the differential amplifier and motor so that the direction of motor rotation is determined by the polarity of the input signal.

6. Inert gas shielded non-consumable electrode electric arc welding apparatus as defined in claim 1 further including an overvoltage protective circuit comprising an input circuit having a plurality of resistors connected in series across which an input voltage is applied which is subject to overvoltage many times greater than the desired output voltage, and a pair of diode circuits connected across at least one of said resistors in inverse parallel relationship to each other, whereby when such input voltage exceeds the desired output voltage, one of said diode circuits becomes conductive, depending upon the polarity of the input voltage, limiting the output voltage to such desired value, and at least one other of said resistors acts to limit the current flowing through such diode to a safe value.

References Cited

UNITED STATES PATENTS

| | | | |
|---|---|---|---|
| 2,832,000 | 4/1958 | Steele | 219—124 X |
| 3,181,046 | 4/1965 | Sutton | 318—207 |

RICHARD M. WOOD, *Primary Examiner.*

J. G. SMITH, *Assistant Examiner.*

U.S. Cl. X.R.

318—138